United States Patent
Lee et al.

(10) Patent No.: US 6,488,080 B2
(45) Date of Patent: Dec. 3, 2002

(54) REFRIGERATOR EVAPORATOR AND METHOD OF MANUFACTURING THE SAME

(75) Inventors: Tae Hee Lee, Seoul (KR); Jang Seok Lee, Incheon (KR); Sang Wook Lee, Seoul (KR); Se Yoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/727,520

(22) Filed: Dec. 4, 2000

(65) Prior Publication Data

US 2001/0013408 A1 Aug. 16, 2001

(30) Foreign Application Priority Data

Feb. 11, 2000 (KR) .......................................... 2000-6496

(51) Int. Cl.[7] .............................................. F28D 1/00
(52) U.S. Cl. .................................. 165/150; 29/890.035
(58) Field of Search ..................... 165/150; 29/890.035, 29/890.07

(56) References Cited

U.S. PATENT DOCUMENTS

| | | | | |
|---|---|---|---|---|
| 2,028,456 A | * | 1/1936 | Karmazin ................... | 165/150 |
| 2,171,790 A | * | 9/1939 | Higham et al. ............. | 165/150 |
| 2,212,912 A | * | 8/1940 | Booth ........................ | 29/890.07 |
| 2,515,972 A | * | 7/1950 | White et al. ............... | 165/150 |
| 2,845,695 A | * | 5/1958 | Grenell ..................... | 29/890.07 |
| 3,648,768 A | * | 3/1972 | Scholl ....................... | 165/171 |
| 5,628,205 A | * | 5/1997 | Rockenfeller et al. ...... | 62/480 |
| 5,725,047 A | * | 3/1998 | Lopez ....................... | 165/150 |
| 6,253,567 B1 | * | 7/2001 | Imanari et al. ............ | 165/150 |

* cited by examiner

Primary Examiner—Henry Bennett
Assistant Examiner—Terrell McKinnon
(74) Attorney, Agent, or Firm—Birch, Stewart, Kolasch & Birch, LLP

(57) ABSTRACT

An integrated refrigerator evaporator having a plurality of pipes and fins is manufactured by injection molding with plastics. According to the present invention, pipes and fins are molded by plastic plates, and a heat exchanger is formed by molding the pipes and fins into a series of "S" shapes. A first bending section formed by the heat exchanger, which is molded in a series of "S" shapes, is inserted into a mold main body to manufacture a header cap. A first header cap is manufactured by injected melted plastic material body into the mold main body under the state of covering the mold main body with a mold cap. The first header cap is engaged with a first header main body having a refrigerant inlet and outlet. The refrigerator evaporator according to the present invention results in a relatively lower product cost than the evaporator composed of a metal substance, as well as a high recyclability.

18 Claims, 6 Drawing Sheets

REFRIGERATOR EVAPORATOR AND METHOD OF MANUFACTURING THE SAME

BACKGROUND OF THE INVENTION

1. Field of the Invention

The present invention relates to a refrigerator evaporator, and more particularly to a refrigerator evaporator and method of manufacturing a refrigerator evaporator of both a more improved structure and manufacturing process than the conventional one using plastic materials.

2. Description of the Prior Art

In general, the refrigerator as an appliance for storing and keeping stuff such as food under low temperatures roughly consists of a storage compartment and a cooling compartment. This type of a refrigerator can be classified into four kinds according to the cooling methods: an ice refrigerator, in which a lump of ice is put on an upper part of the storage compartment to cool down inside thereof; an electric refrigerator, in which gaseous Freon is condensed and transferred to a condenser to be liquefied by discharging heat; a gas refrigerator employing an absorption freezer, which uses ammonia aqueous solution as a refrigerant; and an electronic refrigerator utilizing a Peltier element for the purposes of both cooling and heating the food according to the direction of electric current.

An evaporator is essential to any types of refrigerator, regardless of the kinds of refrigerant to be used, for exchanging latent heat with existent heat by means of evaporation of the refrigerant. Such a conventional refrigerator evaporator has been manufactured by utilizing metals such as copper or aluminum in consideration of the problems in heat exchanging efficiency and pressure endurance, etc. The following is an explanation of the method of manufacturing the conventional refrigerator evaporator made with reference to the accompanying drawings FIGS. 1A and 1B.

FIGS. 1A and 1B are a perspective view and a cross-sectional view illustrating the heat exchange plate used in the conventional refrigerator evaporator.

Referring to FIGS. 1A and 1B, refrigerant pipes 1a, 1b are first extruded by means of metal (e.g., copper, aluminum, etc.). Fins 2a, 2b are then manufactured by molding a metal panel.

Metal refrigerant pipes 1a, 1b are inserted into the fins 2a and 2b and elongated to a desired length. The metal refrigerant pipes 1a, 1b are mechanically engaged with the fins 2a, 2b.

The body incorporating the refrigerant pipes 1a, 1b into the fins 2a, 2b is the heat exchange plate 3.

And, a heat exchange plate 3 is bent in a series of "S" shapes or in the shape of a serpent to be completed as the heat exchanger.

However, since most of the refrigerator evaporator including the ones described above are composed of metal of high thermal conductivity and strength, there are some problems.

First, employing metal substance results in a relatively high material cost of the refrigerator evaporator, thereby elevating the cost of a refrigerator including a heat exchanger.

Second, employing a metal substance also requires a more complicated manufacturing process than employing a non-metal substance, thereby resulting in a high processing cost. Further, the high weight of the metal evaporator causes a problem in transportation.

Third, employing a metal substance lowers recyclability and durability of the product.

Fourth, employing a metal substance impedes modification of the design of the product.

SUMMARY OF THE INVENTION

To resolve the conventional problem described above, an object of the present invention is to provide a refrigerator evaporator having a plurality of pipes and fins which is manufactured by injection molding with plastics.

To accomplish the object, the refrigerator evaporator according to the present invention comprises a heat exchanger having a plurality of pipes for circulating a refrigerant and a plurality of fins molded in a series of "S" shapes for mechanically engaging the plurality of pipes; a first header positioned at a first bending section formed by the heat exchanger molded in a series of "S" shapes and having an inlet pipe and an outlet pipe for a refrigerant, and the first header comprises a plurality of inlet tanks, outlet tanks, return tanks and brackets for preventing distortion of the heat exchanger; and a second header engaged with a second bending section positioned corresponding to the first header, characterized in that the heat exchanger, first header and second header are integrated in plastics.

The method of manufacturing the refrigerator evaporator to achieve an object of the present invention comprises the steps of: forming a heat exchanger by molding pipes and fins with a plastic panel and molding the pipes and fins in a series of "S" shapes; inserting the first bending section formed by molding the heat exchanger in a series of "S" shapes into a mold body for forming a header cap; manufacturing a first header cap by injecting melted plastic material into the mold main body under the state of covering the mold main body with a molding cap; and engaging the first header cap with the main body of the first header having a molding inlet pipe and an outlet pipe of the refrigerant; manufacturing a second header cap by inserting a second bending section of the heat exchanger into the mold main body for manufacturing the first header cap, and by injecting the plastic melting body into the melted plastic material under the state of covering the mold main body with a mold cap; and engaging the second header cap with the second header main body.

DETAILED DESCRIPTION OF THE INVENTION

The following is a detailed description of the preferred embodiment of the present invention made with reference to the accompanying drawings.

FIG. 2 is a cubic sectional view of the refrigerator evaporator according to an embodiment of the present invention.

Figure 1A:
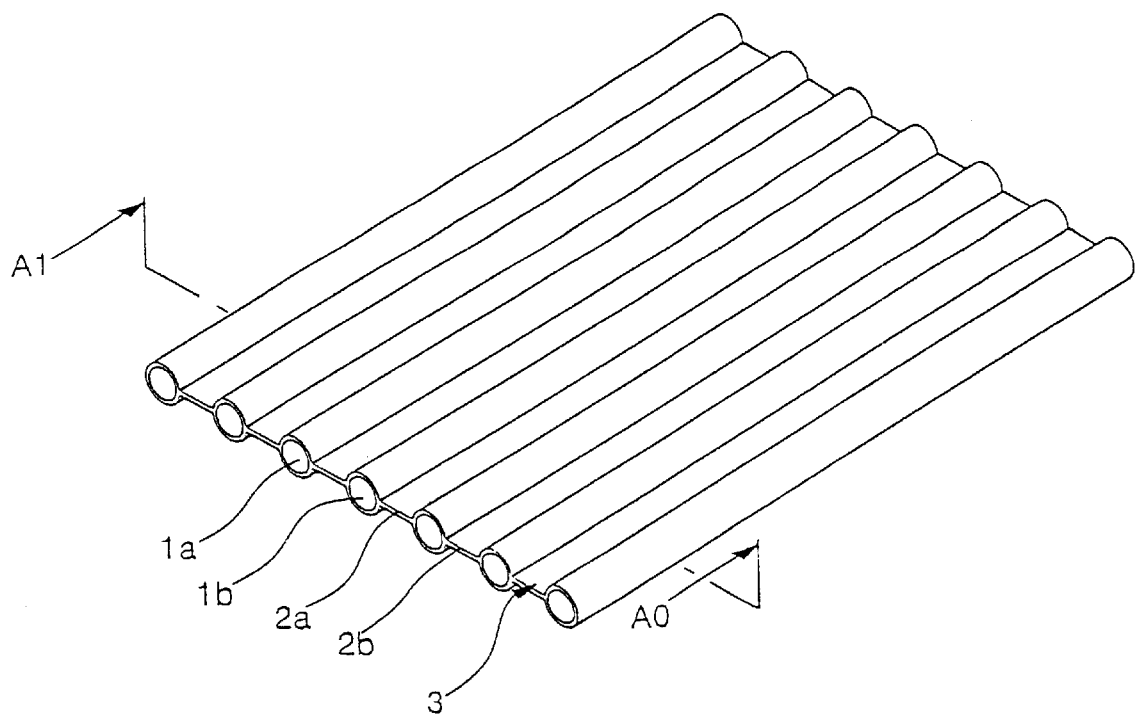
FIGS. 1A and 1B are a perspective view and a cross-sectional view illustrating the pipes and fins used in-the conventional refrigerator evaporator.
Figure 1B:
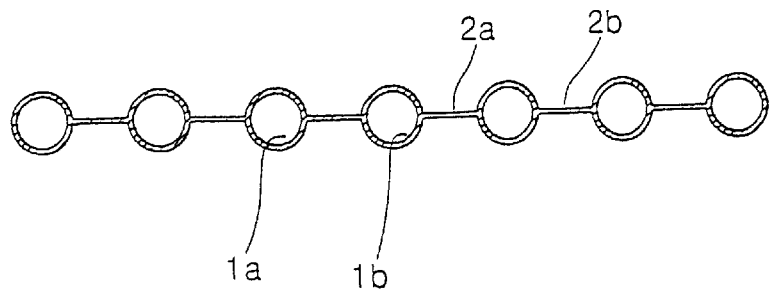
Figure 2A:
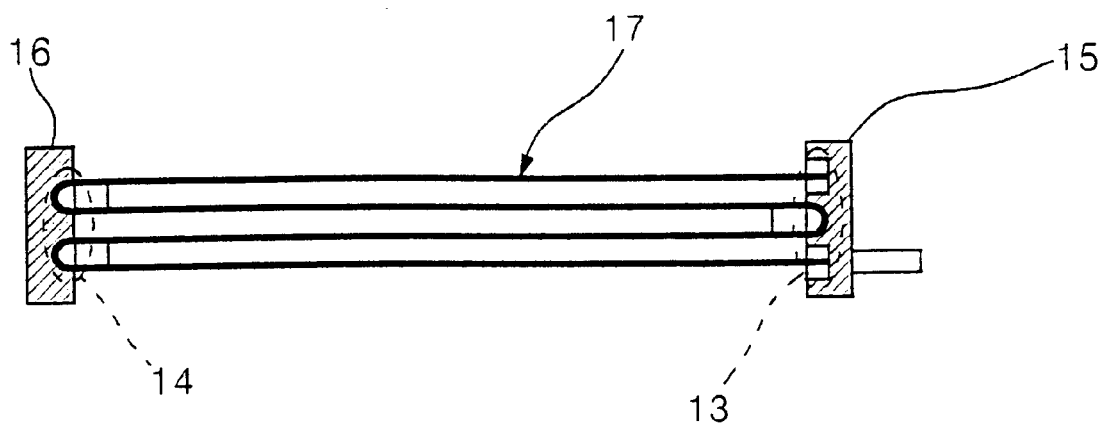
FIGS. 2A–2C are section views of the refrigerator evaporator according to one embodiment of the present invention.
Figure 2B:
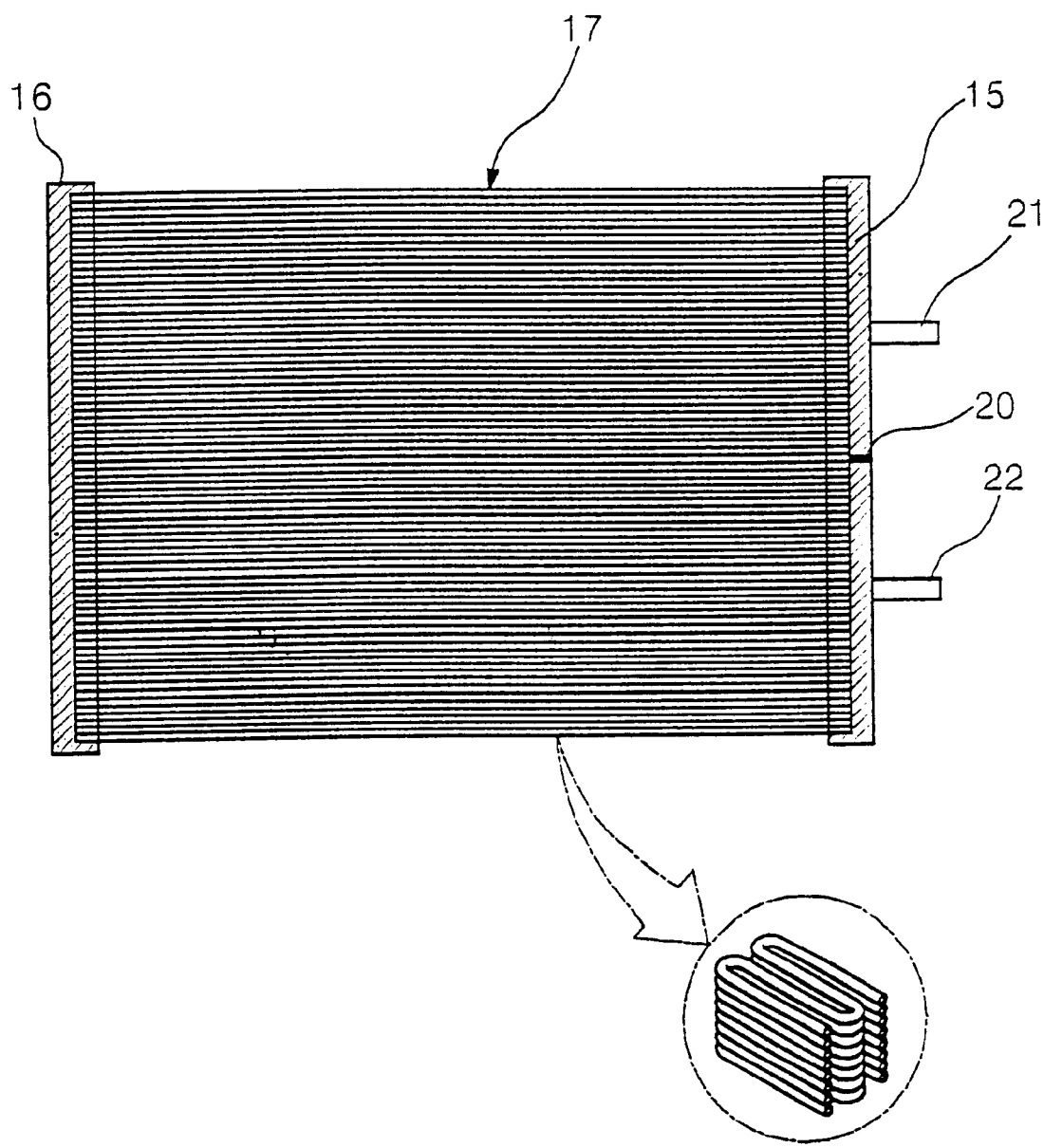

Referring to FIGS. 2A and 2B the refrigerator evaporator according to the present invention comprises a heat exchanger 17 formed by molding a heat exchange plate (13), which consists of a plurality of fins mechanically engaging a plurality of pipes for circulating a refrigerant, in a series of "S" shapes; a first header 15 positioned at a first bending section of the heat exchanger 17 and having an inlet pipe 22 and an outlet pipe 21 for the refrigerant; and a second header 16 engaged with the second bending section 14 of the heat exchanger 17 to be positioned to correspond to the first header 15. The heat exchanger 17, the first header 15 and the second header 16 are preferably extrusion-molded or injection molded with integrated plastics.

The following is a detailed description of the heat exchange plate, and the heat exchanger 17.

The heat exchange plate includes a plurality of fins and pipes for circulating a refrigerant. The pipes are first extruded or injected by means of plastics. Fins are then manufactured by molding a plastic panel.

The plastic pipes for circulating a refrigerant are inserted into the fins and elongated to a desired length. The pipes are mechanically engaged with the fins.

The body incorporating the pipes into the fns is the heat exchange plate. The heat exchange plate is bent in a series of "S" shapes or in the shape of a serpent to be completed as the heat exchanger 17.

Figure 2C:
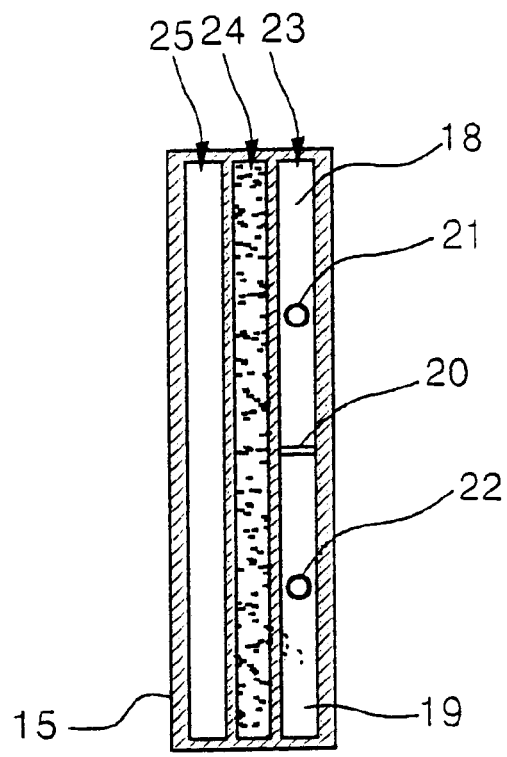

FIG. 2C is a right side sectional view of the refrigerator evaporator according to the embodiment of the present invention.

Referring to FIG. 2C, the first header 15 comprises a header tank 23 divided into an inlet tank 19 having an inlet pipe 22 and an outlet tank 18 having an outlet pipe 21 by a separating plate 20, a bracket 24 for preventing distortion of the heat exchanger 17, and a return tank 25.

Figure 3A:
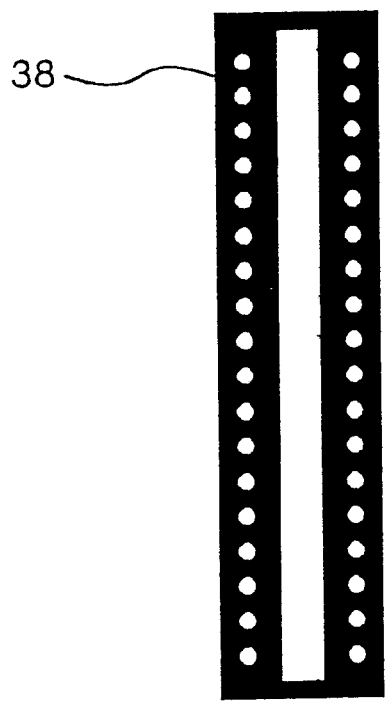
FIGS. 3A and 3B are detailed views illustrating the header.
Figure 3B:
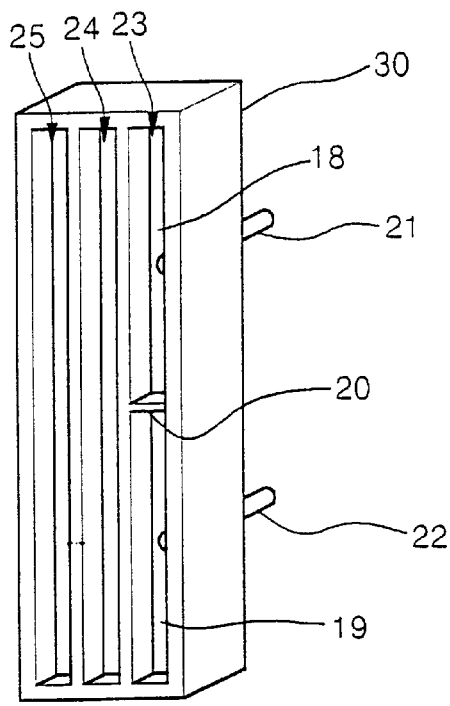

FIG. 3 is a detailed sectional view of the first header 15 shown in FIG. 2C.

The first header 15 roughly comprises a header main body 30 and a header cap 38 as shown in FIG. 3. The header main body 30 further comprises a header tank 23 having an inlet tank 19 and an outlet tank 18, a bracket 24 for preventing distortion of the heat exchanger 17, which is bent in the shape of a serpent, and return tank 25. A refrigerant inlet pipe 22 and a refrigerant outlet pipe 21 are extrusion-molded, respectively, in the inlet tank 19 and the outlet tank 18. The inlet tank 19 is distinguished from the outlet tank 18 by a separating plate 20.

The following is a detailed description of the functioning process of a refrigerator evaporator according to the embodiment of the present invention.

Figure 4:
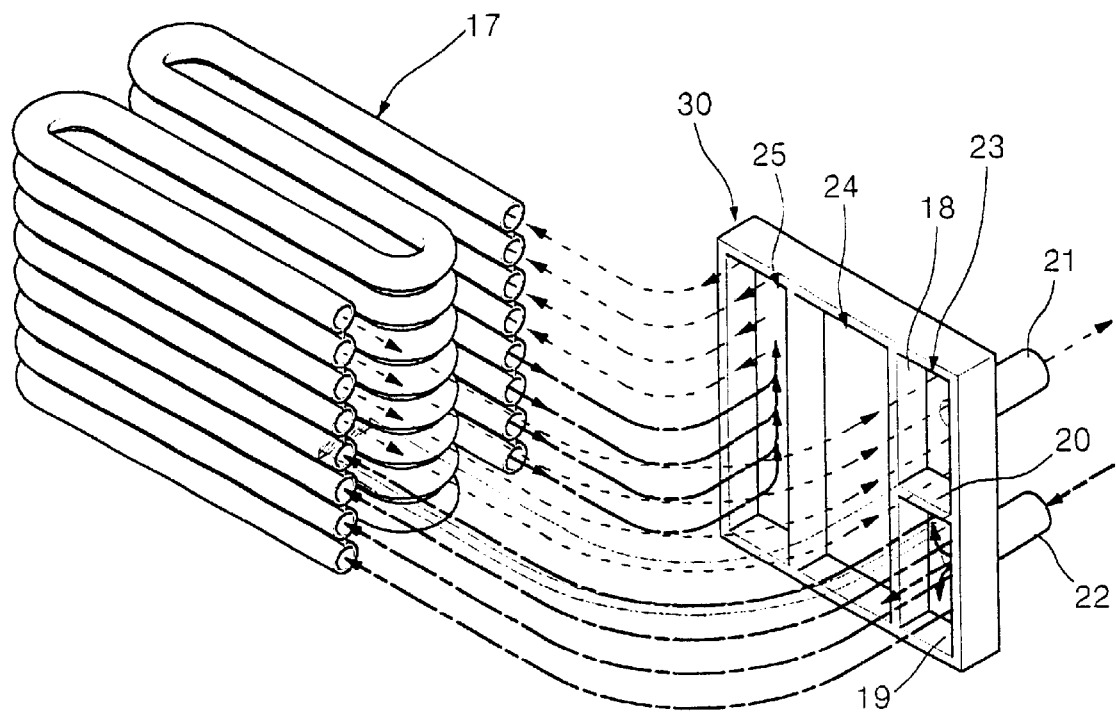
FIG. 4 is a view illustrating the functioning process of a refrigerator evaporator according to an embodiment of the present invention.

FIG. 4 is a view illustrating the functioning process of a refrigerator evaporator according to the embodiment of the present invention.

The refrigerant comes in through the inlet pipe 22 and flows into the plurality of pipes of the heat exchanger 17 formed in the inside of the inlet tank 19 which is placed at the lower portion of the separating plate 20. Then, the refrigerant flows out through the other side pipe of the heat exchanger 17 via the bending sections 13 and 14, and accumulates at the lower part of the return tank 25. When the amount of the refrigerant increase as more refrigerant comes in to the inlet pipe 22, the refrigerant level rises up tot eh upper part of the return tank 25 causing the refrigerant to flow through the bending sections 13 and 14 to the outlet tank 18 placed at the upper part of the separating plate 20 via the pipe placed at the upper section of the heat exchanger 17, and eventually the refrigerant is discharged through the outlet pipe 21.

The following is a detailed description of the manufacturing process of a refrigerator evaporator according to the present invention made with reference to the accompanying drawings.

A plastic heat exchanging plate having a plurality of pipes and fins is manufactured by extrusion or injection. At this stage, the pipes are first extruded or injected by means of plastics. Fins are then manufactured by molding a plastic panel.

Plastic pipes for circulating a refrigerant are inserted into the fins and elongated to a desired length. The pipes are mechanically engaged with the fins.

The heat exchanging plate is repeatedly bent in a series of "S" shapes or in the shape of a serpent. At this stage, two bending sections 13, 14 are formed as shown in FIG. 2. Of the bending sections 13, 14 of the molding heat exchanger 17, the first bending section 13, at which the beginning and end portions of the pipes are positioned, in engaged with the first header 15 of plastic material. The second header 16 of the plastic material is mounted on the opposite side of the first bending section 13.

Accordingly, a refrigerant may flow through the pipes of the extruded or injected heat exchanger 17. Since the air passes through the inside and outside of the heat exchanger 17, a heat exchange between the refrigerant and air is automatically performed.

The first header 15 roughly comprises a header main body 30 and a header cap 38 as shown in FIG. 3. The header main body 30 further comprises a header tank 23 having an inlet tank 19 and an outlet tank 18, a bracket 24 for preventing distortion of the heat exchanger 17, which is bent in the shape of a serpent, and a return tank 25. A refrigerant inlet pipe 22 and a refrigerant outlet pipe 21 are extrusion-molded, respectively, in the inlet tank 19 and the outlet tank 18. The inlet tank 19 is distinguished from the outlet tank 18 by a separating plate 20.

Since the header of the refrigerator evaporator according to the present invention is manufactured by the following process, no additional work is required for an airtight seal between the header cap 38 and the heat exchanger 17.

Figure 5A:
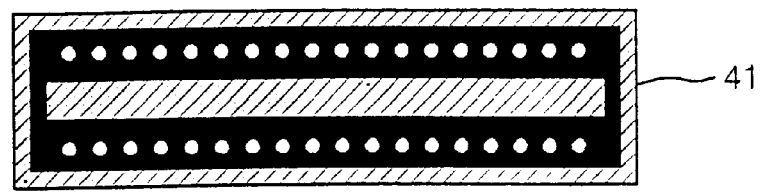
FIGS. 5A and 5B are views illustrating the manufacturing steps of a header of the refrigerator evaporator shown in FIG. 2.
Figure 5B:
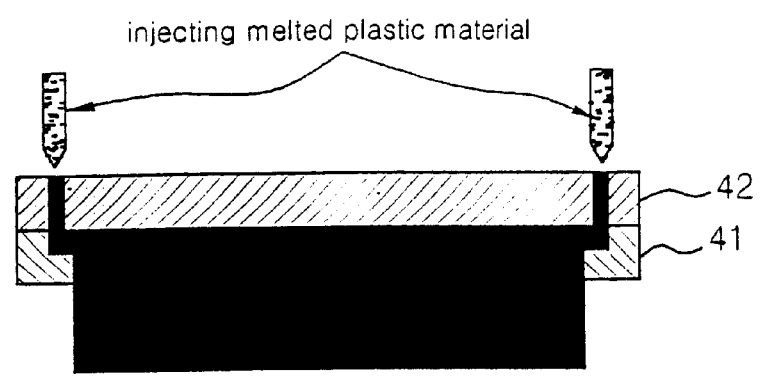

FIG. 5 is a view illustrating the manufacturing steps of a header of the refrigerator evaporator shown in FIG. 2.

In other words, manufacture of the header cap 38 is completed by injecting melted plastic material into the mold main body 41 under the state of covering the mold main body 41 with a cap 42 as shown in FIG. 5. Manufacture of the first header 15 is completed by engaging the header cap 38 with the header main body 30. As a consequence, an airtight seal can be maintained between the header cap 38 and the heat exchange plate 13.

The second header 16 is extruded by the same process as above for manufacturing the first header 15 except that the refrigerant inlet 22 and outlet 21 are not molded because of any necessity. In other words, the second bending section 14 of the pre-manufactured integrated plastic heat exchanger 17 is injected into the mold main body 41, and melted plastic material is inserted into the mold main body 41 under the state of covering the mold main body 41 with the mold cap 42 to complete the header cap of the second header 16. Subsequently, the header cap is engaged with the header main body (not illustrated in the drawings) to complete the second header.

Figure 6:
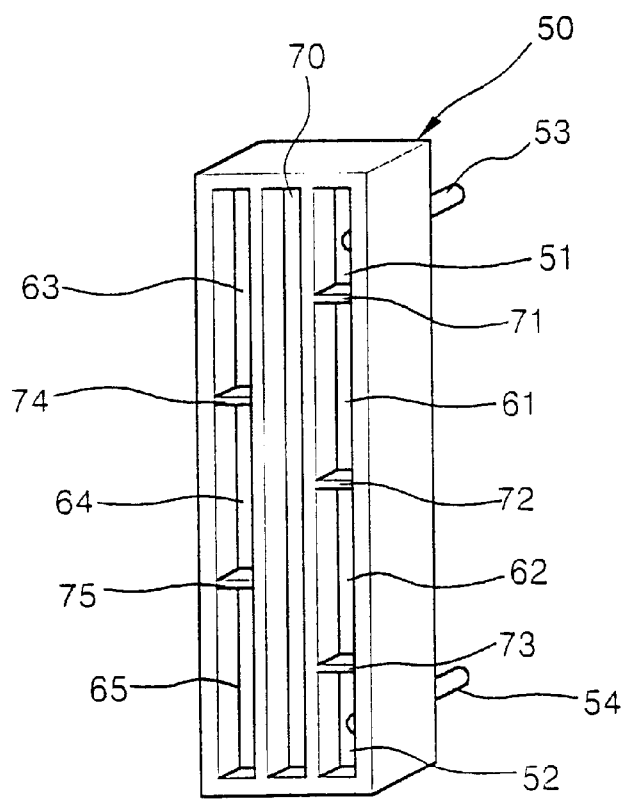
FIG. 6 is a view of the header according to another embodiment of the present invention.

FIG. 6 is a cross-sectional view of the refrigerator evaporator according to another embodiment of the present invention. FIG. 6 shows formation of a plurality of return tanks 63–65 in the header main body 50 by suitably forming plurlity of seperating plates 71–75 inside of the header tank and the return tank. Accordingly, a refrigerator evaporator configured to change the flow channels of the refrigerant is provided through this process.

According to a preferred embodiment of the present invention. manufacture of a heat exchanger with an integrated plastic plate serves to drastically reduce the cost of manufacturing a refrigerator evaporator, which is conventionally composed of metal substance. A simulation of the present invention proved that about 47% of the material cost and about 53% of the manufacturing cost of the heat exchanger according to the present invention could be saved in comparison with the aluminum heat exchanger.

Furthermore, the environment-friendly refrigerator evaporator according to the present invention also serves to protect the environment owning to its notable recyclability, and has a merit of long durability due to non-corrosion. Modification of any layouts of the refrigerator evaporator according to the present invention is also easier than the refrigerator evaporator composed of a metal substance.

What is claimed is:

1. A refrigerator evaporator, comprising:
    a heat exchanger having a plurality of pipes for circulating a refrigerant and a plurality of fins molded in a series of "S" shapes for mechanically engaging the plurality of pipes;
    a first header positioned at a first bending section formed by the heat exchanger molded in a series of "S" shapes and having an inlet pipe and an outlet pipe for a refrigerant, the first header comprising a plurality of inlet tanks, outlet tanks, return tanks and brackets for preventing distortion of the heat exchanger; and
    a second header engaged with a second bending section positioned corresponding to the first header,
    wherein said heat exchanger, first header and second header are integrated in plastics.

2. The refrigerator evaporator of claim 1, wherein said inlet tanks and outlet tanks are integrated tanks divided by at least one separating plate.

3. The refrigerator evaporator of claim 1, wherein a refrigerant inlet is formed at said inlet tank, and a refrigerant outlet is formed at said outlet tank.

4. A refrigerator evaporator, comprising:
    a plastic heat exchanger having a plurality of plastic pipes for circulating a fluid and a plurality of plastic fins interconnecting said plurality of plastic pipes, the heat exchanger being bent in at least one "U" shape so as to form an inlet/outlet section at a first end of said heat exchanger and a bending section at a second end of said heat exchanger;
    a plastic first header engaged with said inlet/outlet section of said heat exchanger, said first header including an inlet tank, an inlet orifice, an outlet tank, and an outlet orifice; and
    a plastic first header cap integrally molded together with said first end of said plastic heat exchanger.

5. The refrigerator evaporator of claim 4, wherein said first header further includes a return tank.

6. The refrigerator evaporator of claim 4, wherein said first header further includes a bracket for preventing distortion of the heat exchanger.

7. The refrigerator evaporator of claim 4, further comprising a plastic second header engaged with said bending section of said heat exchanger.

8. The refrigerator evaporator of claim 7, further comprising a plastic second header cap integrally molded together with said second end of said plastic heat exchanger.

9. The refrigerator evaporator of claim 4, wherein said inlet orifice is an inlet pipe, and said outlet orifice is an outlet pipe.

10. The refrigerator evaporator of claim 4, wherein said heat exchanger is bent in a plurality of "U" shapes so as to form a serpentine configuration.

11. The refrigerator evaporator of claim 10, wherein said first header further includes a return tank.

12. The refrigerator evaporator of claim 11, wherein said first header further includes a bracket for preventing distortion of the heat exchanger.

13. The refrigerator evaporator of claim 12, further comprising a plastic second header engaged with said bending section of said heat exchanger.

14. The refrigerator evaporator of claim 13, further comprising a plastic second header cap integrally molded together with said second end of said plastic heat exchanger.

15. The refrigerator evaporator of claim 14, wherein said inlet tank and said outlet tank are divided by a separating plate.

16. The refrigerator evaporator of claim 15, wherein said inlet orifice is an inlet pipe, and said outlet orifice is an outlet pipe.

17. A method of manufacturing a refrigerator evaporator, comprising the steps of:
    forming pipes and fins by means of a plastic plate;
    manufacturing a heat exchanger by molding said pipes and fins in a series of "S" shapes;
    manufacturing a first header cap by inserting a first bending section, which is formed by said heat exchanger molded in a series of "S" shapes, into a mold main body for manufacturing a header cap, and by injecting melted plastic material into said mold main body under the state of covering the mold main body with a mold cap; and
    engaging said first header cap with a first header main body having an inlet pipe and an outlet pipe.

18. The method of claim 17, further comprising the steps of:
    manufacturing a second header cap by inserting a second bending section of said heat exchanger into said mold main body, and by injecting melted plastic material into said mold main body under the state of covering the mold main body with the mold cap; and
    engaging said second header cap with a second header main body.

* * * * *